(12) United States Patent
Namyslo et al.

(10) Patent No.: US 11,999,301 B2
(45) Date of Patent: Jun. 4, 2024

(54) METHOD FOR AIDING THE MANOEUVRING OF AN AUTOMOTIVE VEHICLE AND AUTOMOTIVE LIGHTING DEVICE

(71) Applicant: VALEO VISION, Bobigny (FR)

(72) Inventors: Stefan Namyslo, Bobigny (FR); Eric Martin Claude Moisy, Bobigny (FR); Marine Courcier, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/787,265

(22) PCT Filed: Dec. 21, 2020

(86) PCT No.: PCT/EP2020/087549
§ 371 (c)(1),
(2) Date: Jun. 17, 2022

(87) PCT Pub. No.: WO2021/123457
PCT Pub. Date: Jun. 24, 2021

(65) Prior Publication Data
US 2023/0050600 A1     Feb. 16, 2023

(30) Foreign Application Priority Data

Dec. 20, 2019    (FR) ..................... 1915174

(51) Int. Cl.
*B60R 1/27*      (2022.01)
*B60Q 1/24*      (2006.01)
(Continued)

(52) U.S. Cl.
CPC ............. *B60R 1/27* (2022.01); *B60Q 1/249* (2022.05); *B60Q 9/00* (2013.01); *B60R 1/22* (2022.01);
(Continued)

(58) Field of Classification Search
CPC .. B60R 1/22; B60R 1/00; B60Q 1/249; B60Q 9/00; H04N 7/185; H04N 23/53; H04N 23/56
See application file for complete search history.

(56) References Cited

U.S. PATENT DOCUMENTS

2008/0266396 A1    10/2008   Stein
2012/0069182 A1     3/2012   Sumi et al.
(Continued)

FOREIGN PATENT DOCUMENTS

| EP | 2 431 227 A1 | 3/2012 |
|---|---|---|
| EP | 3 480 057 A1 | 5/2019 |
| WO | WO 2019/053929 A1 | 3/2019 |

OTHER PUBLICATIONS

International Search Report dated Feb. 5, 2021, in PCT/EP2020/087549 filed Dec. 21, 2020, 3 pages.

*Primary Examiner* — Farzana Hossain
(74) *Attorney, Agent, or Firm* — Oblon, McClelland, Maier & Neustadt, L.L.P.

(57) ABSTRACT

A method for aiding the maneuvering of an automotive vehicle. The method includes the steps of projecting a light pattern towards a projection zone of the ground surface, acquiring an image of the automotive vehicle and the light pattern from an image sensor and providing the acquired image to a user of the automotive vehicle. The projection zone includes at least one of a first virtual rectangle, a second virtual rectangle and/or a third virtual rectangle, defined with respect to a rear point of the carbody, a front point of the carbody and the contact points between the wheels and the ground surface. The invention also provides an automotive lighting device for performing the steps of such a method.

20 Claims, 2 Drawing Sheets

(51) Int. Cl.
  *B60Q 9/00* (2006.01)
  *B60R 1/22* (2022.01)
  *H04N 7/18* (2006.01)
  *H04N 23/53* (2023.01)
  *H04N 23/56* (2023.01)

(52) U.S. Cl.
  CPC ............ *H04N 7/185* (2013.01); *H04N 23/53* (2023.01); *H04N 23/56* (2023.01)

(56) References Cited

U.S. PATENT DOCUMENTS

| | | |
|---|---|---|
| 2018/0091780 A1 | 3/2018 | Stein |
| 2018/0093607 A1* | 4/2018 | Omanovic ............... B60Q 1/34 |
| 2019/0356886 A1 | 11/2019 | Stein |
| 2020/0175722 A1 | 6/2020 | Nagai et al. |

* cited by examiner

[Fig. 1]
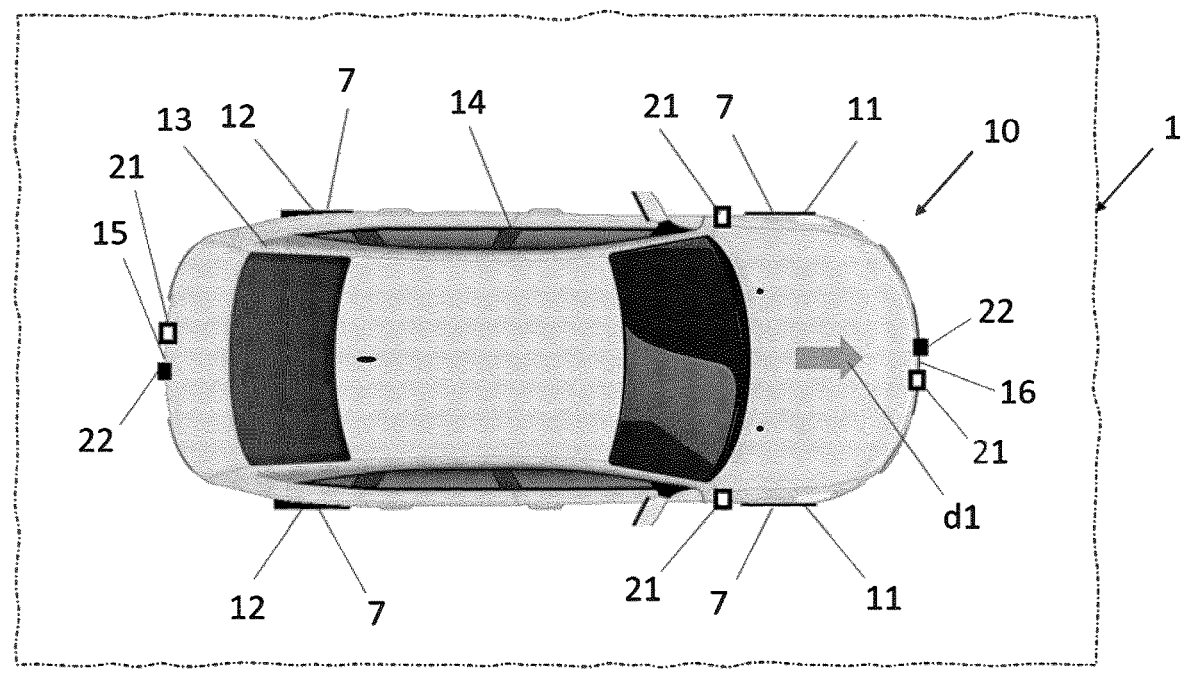
[Fig. 2]
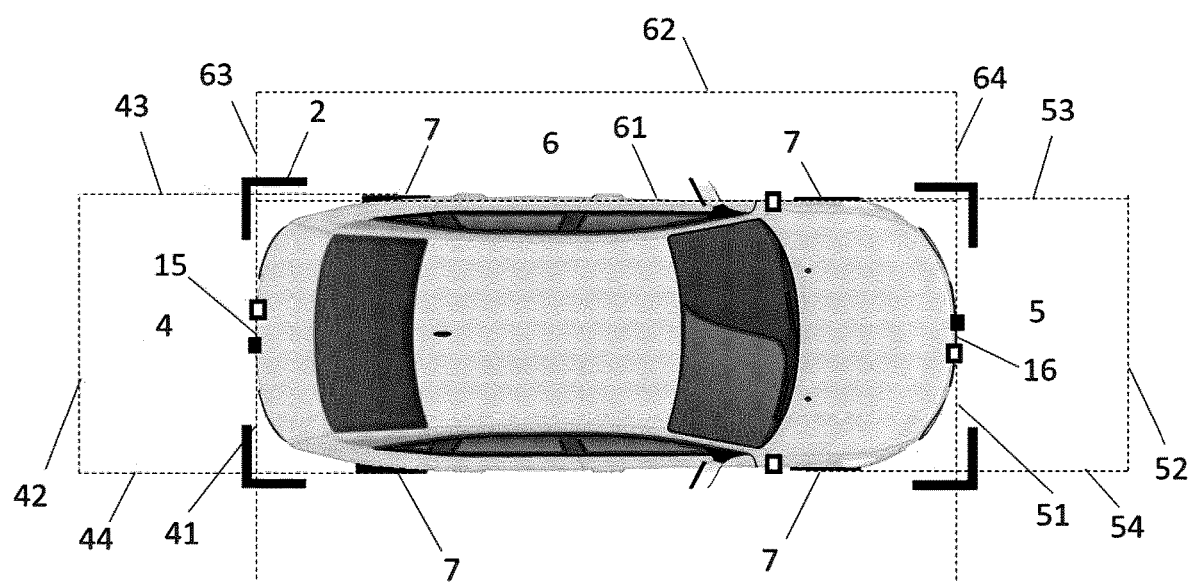

[Fig. 3]
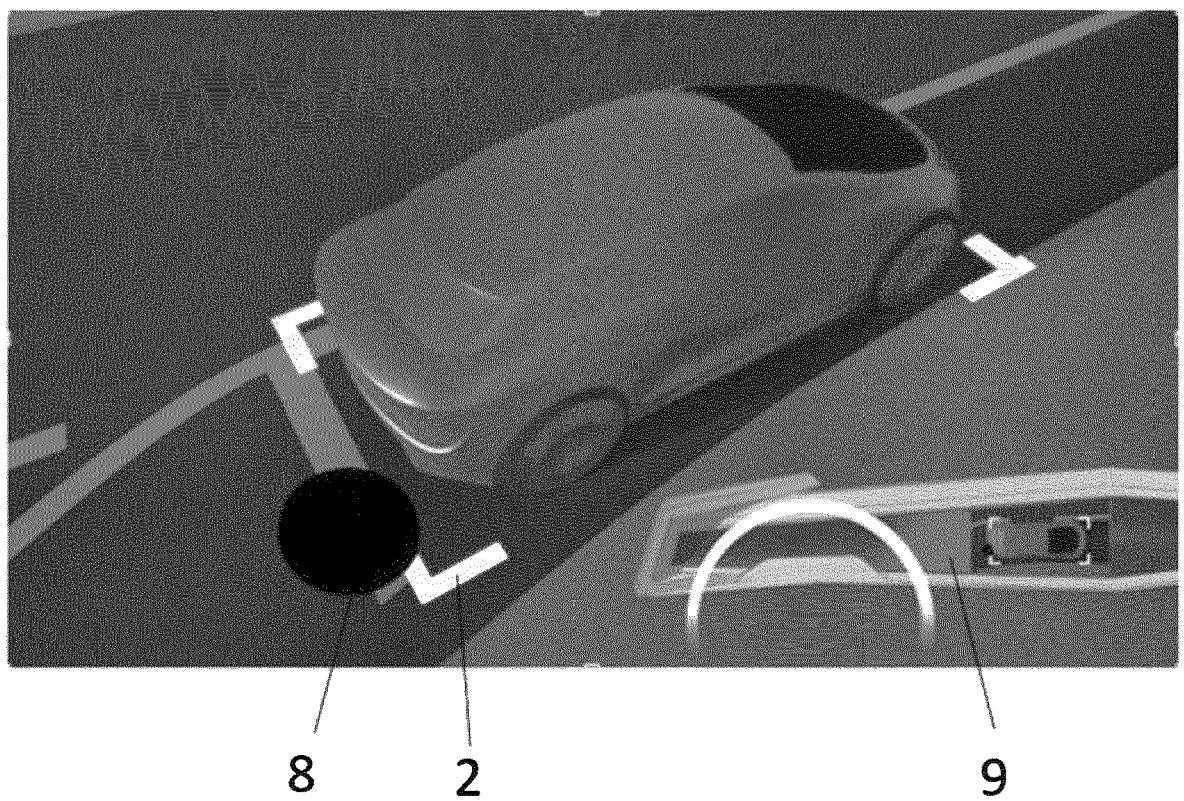

METHOD FOR AIDING THE MANOEUVRING OF AN AUTOMOTIVE VEHICLE AND AUTOMOTIVE LIGHTING DEVICE

This invention is related to the field of vehicle manoeuvring and the aiding system for this purpose, and more especially to the lighting devices involved in this process.

Devices for aiding a vehicle manoeuvring process are widely known. Cameras and displays are intended to provide the driver with the greatest amount of information possible, so that they are able to act as if they were seeing indeed the exterior of the vehicle.

To do so, the usual kit comprises a camera and a display in the interior of the vehicle, showing the images acquired by the camera. Some additional aiding information can also be presented in the display together with the images of the camera, such as the trajectory of the vehicle, together with visual and sound warnings for the driver.

However, the driver is not always confident with the virtual information provided by these aiding systems. A solution for this problem is sought.

The invention provides a solution for these problems by means of a method for aiding the manoeuvring of an automotive vehicle which comprises a plurality of front wheels and rear wheels in contact with a ground surface, a carbody with a body pillar and an advance direction, the method comprising the steps of projecting at least a portion of a light pattern towards a projection zone of the ground surface;

acquiring an image of the automotive vehicle and the light pattern from an image sensor;

providing the acquired image to a user of the automotive vehicle;

wherein the projection zone comprises at least one of a first virtual rectangle, a second virtual rectangle and/or a third virtual rectangle, all of them being located in a projection plane defined by contact points between the wheels and the ground surface, wherein the first virtual rectangle comprises a first side perpendicular to the advance direction, located at a distance lower than 10 cm to the rear point of the projection of the carbody on the ground surface, the rear point being defined according to the advance direction;

a second side parallel to the first side, located at least 50 cm behind the first side;

a third side perpendicular to the first and second sides, the prolongation of which cuts a contact point of one rear wheel;

a fourth side parallel to the third side, the prolongation of which cuts a contact point of the other rear wheel;

the second virtual rectangle comprising a first side perpendicular to the advance direction, located at a distance lower than 10 cm in front of the front point of the projection of the carbody on the ground surface, the front point defined according to the advance direction;

a second side parallel to the first side, located at least 50 cm in front of the first side;

a third side perpendicular to the first and second sides, the prolongation of which cuts a contact point of one front wheel;

a fourth side parallel to the third side, the prolongation of which cuts a contact point of the other front wheel.

the third virtual rectangle comprising a first side tangent to the projection of the body pillar on the ground surface;

a second side parallel to the first side, located 100 cm beside the first side;

a third side perpendicular to the first and second sides, the prolongation of which is in contact with the rear point of the projection of the carbody on the ground surface, the rear point defined according to the advance direction;

a fourth side parallel to the third side, the prolongation of which is in contact with the front point of the projection of the carbody on the ground surface, the front point defined according to the advance direction.

The projection of the light pattern is carried out towards the ground surface, which does not mean that the light actually reaches the ground surface, since the ground surface could comprise obstacles or holes which would prevent light to reach this particular zone of the ground surface.

The first virtual rectangle is a virtual rectangle which is intended to be located behind the car, and the lateral sides (third and fourth sides) cross contact points between the rear wheels of the vehicle and the ground surface. Since the wheels are intended to contact the ground surface in more than one point, this invention considers the points which are furthest from the center of the car, to maximize the area of the first virtual rectangle but taking into account the limits of the projection of the wheels over the ground surface.

This method includes the projection of a light pattern which provides useful information, since any object of hole in the ground which is in the trajectory of the car (either behind or in front of it) will affect the real light projection, thus increasing the confidence created in the user. In the context of the present invention, the user is to be understood as a human driver or as a control unit of an autonomous driving system.

As far as the body pillar is referred, depending on the building of the car, may be an A-pillar, a B-pillar or a C-pillar, but the skilled person understands that it refers to a pillar which laterally delimits the side of the vehicle.

A light pattern will be understood as the product of light emission, having at least one sharp side which is a direct consequence of the lighting device (and not of a collision with a part of the carbody, for example). The sharpness is considered as a variation of the illuminance on a flat ground by more than 1 lx per cm.

In some particular embodiments, the first side of the first virtual rectangle is in contact with the rear point of the projection of the carbody on the ground surface; and the second side of the first virtual rectangle is located at least 200 cm behind the first side.

In more particular embodiments, the second side of the first virtual rectangle is located 300 cm behind the first side.

These embodiments define a more restricted first virtual rectangle, which is useful for some embodiments where a closer are is more adequate for the information purposes.

In some particular embodiments, the projection zone comprises more than one of the first virtual rectangle, the second virtual rectangle and/or the third virtual rectangle.

A combined pattern is preferred where the manoeuvring involves the necessity of the vehicle data in more than one direction.

In some particular embodiments, the light pattern comprises visible light.

Visible light allows a person which is out of the vehicle to also see the light pattern, in the event they want to help the driver with indications to perform the manoeuvre.

In some particular embodiments, the light pattern comprises infrared or near infrared light.

Infrared light is useful in the event of low visibility conditions.

In some particular embodiments, the method further comprises the step of detecting the deformation of the light pattern to identify an obstacle.

The light pattern may be deformed by the presence of an obstacle and this provides a possibility to detect its presence. The control unit of the lighting device or another controlling unit of the vehicle may compare the acquired image of the camera with the expected image and thus identify the presence of a disturbing object or hole. Said control unit can also provide a specific signal to the user.

In some particular embodiments, the method further comprises the step of modifying the shape and/or colour and/or blinking pattern of the projected light depending on the distance between the light pattern and the obstacle.

In the event an object is detected, the light pattern may be modified to reflect the distance between the vehicle and the object.

In some particular embodiments, the step of providing the acquired image to a user of the automotive vehicle comprises modifying the shape and/or colour and/or blinking pattern of the provided image depending on the distance between the light projection and the obstacle.

In these embodiments, the modifications are only made on the image provided in the car screen, not necessarily on the light pattern which is projected by the light source.

In some particular embodiments, the method further comprises the step of triggering driving assistance signals, such as sounds or visual warnings in the automotive vehicle.

This helps the driver to realize that an object or hole is near the vehicle.

In a second inventive aspect, the invention provides a lighting device for helping in automotive vehicle manoeuvring, the device comprising at least an image sensor configured to provide an image of the automotive vehicle; and at least a solid-state light source providing a light pattern according to the method of the first inventive aspect.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, the device is independent from a headlamp, a rearlamp or a foglamp. In more particular embodiments, the device is located in a rocker-panel, a wheel arch, a mirror, a side repetitor, a bumper or a licence plate of the automotive vehicle. In different embodiments, the device is integrated in a headlamp, a rearlamp or a foglamp.

Any of these locations are valid to install a lighting device according to the invention.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a plant view of an automotive vehicle which is used in a method according to the invention.

FIG. 2 shows the projection zone which is part of a method according to the invention, and which is defined with respect to the elements which have been presented in FIG. 1.

FIG. 3 shows the image of the vehicle with the projected light pattern displayed in the interior of the vehicle, according to a particular embodiment of a method according to the invention.

Elements of the example embodiments are consistently denoted by the same reference numerals throughout the drawings and detailed description where appropriate:

1 Ground surface
2 Light pattern
3 Camera
4 First virtual rectangle
41 First side of the first virtual rectangle
42 Second side of the first virtual rectangle
43 Third side of the first virtual rectangle
44 Fourth side of the first virtual rectangle
5 First virtual rectangle
51 First side of the second virtual rectangle
52 Second side of the second virtual rectangle
53 Third side of the second virtual rectangle
54 Fourth side of the second virtual rectangle
6 Third virtual rectangle
61 First side of the third virtual rectangle
62 Second side of the third virtual rectangle
63 Third side of the third virtual rectangle
64 Fourth side of the third virtual rectangle
7 Contact points
8 Obstacle
9 Interior of the vehicle
10 Automotive lighting device
11 Front wheels
12 Rear wheels
13 Carbody
14 B-pillar
15 Rear point
16 Front point
20 Lighting device
21 Cameras
22 Light source
d1 Advance direction The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a plant view of an automotive vehicle 10 which is used in a method according to the invention.

This automotive vehicle 10 comprises
two front wheels 11 and two rear wheels 12 which are in contact with a ground surface 1; and
a carbody 13 with a B-pillar 14.

The automotive vehicle 10 defines an advance direction, which is the direction of the normal forward movement of the vehicle, as the person skilled in the art would obviously construe.

The wheels 11, 12 have contact points 7, which are the more exterior points in contact between each wheel and the ground surface 1.

In turn, the projection of the carbody 13 on the ground surface 1 has a rear point 15, which is the rearest point of this projection according to the advance direction d1, and a front point 16, which is the frontest point of this projection according to the advance direction d1.

This automotive vehicle 10 also comprises some cameras 21, including a front camera, a rear view camera and two side cameras, which are configured to provide a 360° view of the vehicle 10, and a LED arrangement 22, which is configured to provide a light pattern according to the method of the invention.

FIG. 2 shows the projection zone which is part of a method according to the invention, and which is defined with respect to the elements which have been presented in FIG. 1.

This projection zone comprises three virtual rectangles, 4, 5, 6. In some functionalities, the light pattern 2 will only be projected in one or two of them, so the use of the three virtual rectangles at the same time only occurs in some particular embodiments of this method.

The first virtual rectangle 4 comprises
a first side 41 perpendicular to the advance direction d1, located in contact with the rear point 15;
a second side 42 parallel to the first side 41, located 150 cm behind the first side 41;
a third side 43 perpendicular to the first 41 and second 42 sides, the prolongation of which cuts the contact point 7 of one rear wheel 12;
a fourth side 44 parallel to the third side 43, the prolongation of which cuts the contact point 7 of the other rear wheel 12.

This first virtual rectangle 4 represents a zone behind the car where a first portion of the light pattern 2 may be located.

The second virtual rectangle 5 comprises
a first side 51 perpendicular to the advance direction d1, located in contact with the front point 16;
a second side 52 parallel to the first side 51, located 100 cm in front of the first side 51;
a third side 53 perpendicular to the first 51 and second 52 sides, the prolongation of which cuts the contact point 7 of one front wheel 11;
a fourth side 54 parallel to the third side 53, the prolongation of which cuts the contact point 7 of the other front wheel 11.

This second virtual rectangle 5 represents a zone in front of the car where a second portion of the light pattern 2 may be located.

The third virtual rectangle 6 comprises
a first side 61 tangent to the projection of the B-pillar 14 on the ground surface 1;
a second side 62 parallel to the first side 61, located 100 cm beside the first side 61;
a third side 63 perpendicular to the first 61 and second 62 sides, the prolongation of which is in contact with the rear point 15;
a fourth side 64 parallel to the third side 63, the prolongation of which is in contact with the front point 16.

This third virtual rectangle 6 represents a zone beside the car where a third portion of the light pattern 2 may be located.

Obviously, there are two third virtual rectangles 6, one at each side of the vehicle 10.

A method according to the invention comprises the following steps:
projecting at least a portion of a light pattern 2 towards the projection zone;
acquiring an image of the automotive vehicle 10 and the light pattern 2 from the camera 3;
providing the acquired image to a user of the automotive vehicle 10.

This light pattern 2 may have some portions located outside the virtual rectangles 4, 5, 6, but it is essential that this light pattern 2 has at least one portion inside one of these virtual rectangles 4, 5, 6.

The light pattern 2 may comprise visible light, infrared or near infrared light or a combination thereof, to improve the visibility of the light pattern by the camera even in low visibility conditions.

As shown in FIG. 3, the image of the vehicle with the projected light pattern is displayed in the interior 9 of the vehicle, so that a user may have the real perception of the vehicle 10 and of the real light pattern 2 which is projected, thus improving the confidence in this aiding systems.

In this figure, the light pattern is deformed by the presence of a hole. The camera not only acquires the image, but is also configured to compare the acquired light pattern with the projected one. In the event that an obstacle or a hole, such in the case of FIG. 3, causes a distortion or deformation in the acquired light pattern, the camera detects this modification and informs the driver that an obstacle is located within the corresponding virtual rectangle.

As a consequence, either the light pattern or the displayed image may be modified depending on the distance between the vehicle and the object. In both cases, the user will see a modified image, either with a modified shape, a modified colour or a blinking pattern. Further driving assistance signals, such as sounds or visual warnings, may also be triggered in the automotive vehicle 10.

The invention claimed is:

1. Method for aiding the maneuvering of an automotive vehicle which comprises a plurality of front wheels and rear wheels in contact with a ground surface, a carbody with a body pillar and an advance direction, the method comprising the steps of:
projecting at least a portion of a light pattern towards a projection zone of the ground surface;
acquiring an image of the automotive vehicle and the light pattern from an image sensor; and
providing the acquired image to a user of the automotive vehicle;
wherein the projection zone comprises at least one of a first virtual rectangle, a second virtual rectangle and/or a third virtual rectangle, all of them being located in a projection plane defined by contact points between the wheels and the ground surface, wherein the first virtual rectangle comprises:
- a first side perpendicular to the advance direction, located at a distance lower than 10 cm to the rear point of the projection of the carbody on the ground surface, the rear point being defined according to the advance direction;
- a second side parallel to the first side, located at least 50 cm behind the first side;
- a third side perpendicular to the first and second sides, the prolongation of which cuts a contact point of one rear wheel; and
- a fourth side parallel to the third side, the prolongation of which cuts a contact point of the other rear wheel;

wherein the second virtual rectangle comprising:
- a first side perpendicular to the advance direction, located at a distance lower than 10 cm in front of the front point of the projection of the carbody on the ground surface, the front point being defined according to the advance direction;
- a second side parallel to the first side, located at least 50 cm in front of the first side;
- a third side perpendicular to the first and second sides, the prolongation of which cuts a contact point of one front wheel; and
- a fourth side parallel to the third side, the prolongation of which cuts a contact point of the other front wheel; and wherein the third virtual rectangle comprising:
- a first side tangent to the projection of the body pillar on the ground surface;
- a second side parallel to the first side, located 100 cm beside the first side;
- a third side perpendicular to the first and second sides, the prolongation of which is in contact with the rear point of the projection of the carbody on the ground surface; and
- a fourth side parallel to the third side, the prolongation of which is in contact with the front point of the projection of the carbody on the ground surface.

2. The method of claim 1, wherein:
the first side of the first virtual rectangle is in contact with the rear point of the projection of the carbody on the ground surface; and
the second side of the first virtual rectangle is located at least 200 cm behind the first side.

3. The method of claim 2, wherein the projection zone comprises more than one of the first virtual rectangle, the second virtual rectangle and/or the third virtual rectangle.

4. The method of claim 2, wherein the light pattern comprises visible light.

5. The method of claim 2, wherein the light pattern comprises infrared or near infrared light.

6. The method of claim 2, further comprising the step of detecting the deformation of the light pattern to identify an obstacle.

7. The method of claim 1, wherein the projection zone comprises more than one of the first virtual rectangle, the second virtual rectangle and/or the third virtual rectangle.

8. The method of claim 7, wherein the light pattern comprises visible light.

9. The method of claim 1, wherein the light pattern comprises visible light.

10. The method of claim 1, wherein the light pattern comprises infrared or near infrared light.

11. The method of claim 1, further comprising the step of detecting the deformation of the light pattern to identify an obstacle.

12. The method of claim 11, further comprising the step of modifying the shape and/or colour and/or blinking pattern of the provided image depending on the distance between the light pattern and the obstacle.

13. The method of claim 11, wherein the step of providing the acquired image to a user of the automotive vehicle comprises modifying the shape and/or colour and/or blinking pattern of the provided image depending on the distance between the light pattern and the obstacle.

14. The method of claim 11, further comprising the step of triggering driving assistance signals, such as sounds or visual warnings in the automotive vehicle.

15. The method of claim 12, further comprising the step of triggering driving assistance signals, such as sounds or visual warnings in the automotive vehicle.

16. Lighting device for helping in maneuvering of an automotive vehicle which comprises a plurality of front wheels and rear wheels in contact with a ground surface, a carbody with a body pillar and an advance direction, the device comprising:
at least an image sensor configured to provide an image of the automotive vehicle; and at least a solid-state light source providing a light pattern according to a method comprising the steps of:
projecting at least a portion of a light pattern towards a projection zone of the ground surface;
acquiring an image of the automotive vehicle and the light pattern from an image sensor; and
providing the acquired image to a user of the automotive vehicle;
wherein the projection zone comprises at least one of a first virtual rectangle, a second virtual rectangle and/or a third virtual rectangle, all of them being located in a projection plane defined by contact points between the wheels and the ground surface, wherein the first virtual rectangle comprises:
- a first side perpendicular to the advance direction, located at a distance lower than 10 cm to the rear point of the projection of the carbody on the ground surface, the rear point being defined according to the advance direction;
- a second side parallel to the first side, located at least 50 cm behind the first side;
- a third side perpendicular to the first and second sides, the prolongation of which cuts a contact point of one rear wheel; and
- a fourth side parallel to the third side, the prolongation of which cuts a contact point of the other rear wheel;

wherein the second virtual rectangle comprising:
- a first side perpendicular to the advance direction, located at a distance lower than 10 cm in front of the front point of the projection of the carbody on the ground surface, the front point being defined according to the advance direction;
- a second side parallel to the first side, located at least 50 cm in front of the first side;
- a third side perpendicular to the first and second sides, the prolongation of which cuts a contact point of one front wheel; and a fourth side parallel to the third side, the prolongation of which cuts a contact point of the other front wheel; and wherein the third virtual rectangle comprising:
a first side tangent to the projection of the body pillar on the ground surface; a second side parallel to the first side, located 100 cm beside the first side;
a third side perpendicular to the first and second sides, the prolongation of which is in contact with the rear point of the projection of the carbody on the ground surface; and
a fourth side parallel to the third side, the prolongation of which is in contact with the front point of the projection of the carbody on the ground surface.

17. The lighting device of claim 16, which is independent from a headlamp, a rearlamp or a foglamp.

18. The lighting device of claim 17, wherein the device is located in a rockerpanel, a wheel arch, a mirror, a side repetitor, a bumper or a license plate of the automotive vehicle.

19. The lighting device of claim 10, which is integrated in a headlamp, a rearlamp or a foglamp.

20. Lighting device of claim 16, wherein the for helping in automotive vehicle maneuvering, the device comprising:
at least a solid-state light source provides the light pattern according to the method wherein:
the first side of the first virtual rectangle is in contact with the rear point of the projection of the carbody on the ground surface; and
the second side of the first virtual rectangle is located at least 200 cm behind the first side.

\* \* \* \* \*